(12) United States Patent
Vasilyev et al.

(10) Patent No.: US 12,537,599 B2
(45) Date of Patent: Jan. 27, 2026

(54) ALL-OPTICAL PHASE-PRESERVING SIGNAL AMPLITUDE PROCESSORS

(71) Applicant: BOARD OF REGENTS, THE UNIVERSITY OF TEXAS SYSTEM, Austin, TX (US)

(72) Inventors: Michael Vasilyev, Plano, TX (US); Cheng Guo, Arlington, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 287 days.

(21) Appl. No.: 18/483,818

(22) Filed: Oct. 10, 2023

(65) Prior Publication Data

US 2024/0137124 A1 Apr. 25, 2024

Related U.S. Application Data

(60) Provisional application No. 63/379,318, filed on Oct. 13, 2022.

(51) Int. Cl.
| | |
|---|---|
| *H04B 10/2543* | (2013.01) |
| *G02F 1/365* | (2006.01) |
| *H04B 10/40* | (2013.01) |
| *H04B 10/50* | (2013.01) |
| *H04B 10/61* | (2013.01) |

(52) U.S. Cl.
CPC ......... *H04B 10/2543* (2013.01); *G02F 1/365* (2013.01); *H04B 10/6163* (2013.01); *H04B 10/40* (2013.01); *H04B 10/50* (2013.01)

(58) Field of Classification Search
None
See application file for complete search history.

(56) References Cited

U.S. PATENT DOCUMENTS

| | | |
|---|---|---|
| 7,505,690 B2 | 3/2009 | Vasilyev et al. |
| 8,340,484 B2 | 12/2012 | Vasilyev et al. |

(Continued)

OTHER PUBLICATIONS

M. Vasilyev and T. I. Lakoba, "All-optical multichannel 2R regeneration in a fiber-based device," Opt. Lett. 30, 1458-1460 (2005).

(Continued)

*Primary Examiner* — Darren E Wolf
(74) *Attorney, Agent, or Firm* — Meunier Carlin & Curfman LLC

(57) ABSTRACT

An all-optical signal processor includes one or more input ports configured to receive one or more optical signal channels, a first nonlinear optical processor configured to receive an input signal from the input port and having one or more sections of a first nonlinear medium, an optical phase conjugator optically configured to receive the output signal of the first nonlinear optical processor, a second nonlinear optical processor configured to receive an output signal from the optical phase conjugator and having one or more sections of a second nonlinear medium, and one or more output ports configured to receive the output signal from the second nonlinear optical processor. Variations of the all-optical signal processor can include a single nonlinear optical processor through which an output of the optical phase conjugator co-propagates or counter-propagates with the input signal.

20 Claims, 13 Drawing Sheets

(56) References Cited

U.S. PATENT DOCUMENTS

| | | | | |
|---|---|---|---|---|
| 2009/0196630 | A1* | 8/2009 | Ishaug | H04B 10/697 398/193 |
| 2011/0095819 | A1* | 4/2011 | Velazquez | H03F 1/3247 330/149 |
| 2018/0337641 | A1* | 11/2018 | Prentice | H04B 10/25754 |
| 2019/0243164 | A1* | 8/2019 | Nelson | H03K 17/687 |
| 2020/0350995 | A1* | 11/2020 | Lord | H04B 10/70 |
| 2021/0409122 | A1* | 12/2021 | Zhou | G01S 7/4911 |

OTHER PUBLICATIONS

L. Li, P. G. Patki, Y. B. Kwon, V. Stelmakh, B. D. Campbell, M. Annamalai, T. I. Lakoba, and M. Vasilyev, "All-optical regenerator of multi-channel signals," Nature Comm. 8, 884 (2017).

J. P. Gordon and L. F. Mollenauer, "Phase noise in photonic communications systems using linear amplifiers," Opt. Lett. 15, 1351 (1990).

A. G. Striegler, M. Meissner, K. Cvecek, K. Sponsel, G. Leuchs, and B. Schmauss, "NOLM-Based RZ-DPSK Signal Regeneration," IEEE Photon. Technol. Lett. 17, 639 (2005).

K. Cvecek, K. Sponsel, R. Ludwig, C. Schubert, C. Stephan, G. Onishchukov, B. Schmauss, and G. Leuchs, "2R-Regeneration of an 80-GB/s RZ-DQPSK Signal by a Nonlinear Amplifying Loop Mirror," IEEE Photon. Technol. Lett. 19, 1475 (2007).

K. Cvecek, K. Sponsel, C. Stephan, G. Onishchukov, R. Ludwig, C. Schubert, B. Schmauss, and G. Leuchs, "Phase-preserving amplitude regeneration for a WDM RZ-DPSK signal using a nonlinear amplifying loop mirror," Opt. Express 16, 1923 (2008).

T. Roeslingshoefer, T. Richter, C. Schubert, G. Onishchukov, B. Schmauss, and G. Leuchs, "All-optical phase-preserving multilevel amplitude regeneration," Opt. Express 22, 27077 (2014).

C. Guo, M. Vasilyev, and T. I. Lakoba, "Amplitude regeneration and phase noise suppression of an 8-PSK signal by an attenuation-imbalanced NOLM," CLEO 2022 conference, San Jose, CA, May 15-20, 2022, paper STh5M.6.

M. Vasilyev, "Distributed phase-sensitive amplification," Opt. Express 13, 7563-7571 (2005), http://www.opticsinfobase.org/abstract.cfm?URI=oe-13-19-7563.

P. V. Mamyshev, "All-optical data regeneration based on self-phase modulation effect," in Proc. of the European Conference on Optical Communications (ECOC), Madrid, Spain, 1998, pp. 475-476.

K. Solis-Trapala, M. D. Pelusi, H. N. Tan, T. Inoue, and S. Namiki, "Transmission optimized impairment mitigation by 12 stage phase conjugation of WDM 24×48 GB/s DP-QPSK signals," in Proc. of the Optical Fiber Communications (OFC) Conference, Los Angeles, CA, Mar. 22-26, 2015, paper Th3C.2.

I. D. Phillips et al., "Exceeding the nonlinear-Shannon limit using Raman laser based amplification and optical phase conjugation," in Proc. of the Optical Fiber Communications (OFC) Conference, San Francisco, CA, Mar. 9-13, 2014, paper M3C.1.

I. Sackey et al., "Kerr nonlinearity mitigation in 5×28-GBd PDM 16-QAM signal transmission over a dispersion uncompensated link with backward-pumped distributed Raman amplification," Opt. Express 22, 27381-27391 (2014).

C. Guo and M. Vasilyev, "Phase-preserving amplitude regeneration in a Mamyshev regenerator with mid-stage optical phase conjugation," 2023 Optical Fiber Communications Conference and Exhibition (OFC), San Diego, CA, USA, 2023, pp. 1-3, doi: 10.1364/OFC.2023.W2A.31.

* cited by examiner

ITU channel number

ALL-OPTICAL PHASE-PRESERVING SIGNAL AMPLITUDE PROCESSORS

CROSS-REFERENCE TO RELATED APPLICATIONS

This application claims priority to, and the benefit of, U.S. Provisional Patent App. No. 63/379,318, filed Oct. 13, 2022, which is incorporated herein by reference in its entirety.

BACKGROUND

The tremendous multi-terahertz bandwidth of optical communication links makes them preferred the means of data transmission for distances from several meters to hundreds of miles (e.g., transoceanic distances). However, the conversion of electrical signals to optical signals (e.g., for traffic aggregation), and optical signals to electrical signals (e.g., for end-user distribution or opto-electro-optical regeneration), is currently limited to bandwidth less than about 100 GHz. Thus, for full utilization, the available optical bandwidth can be split into many channels with a frequency separation of about 25 GHz to 400 GHz (e.g., $\Delta f \sim 25\text{-}400$ GHz), which is a technique generally referred to as wavelength-division multiplexing (WDM). In some cases, each channel may carry a useful signal of up to $\Delta f$ bandwidth. One of the crucial advantages of optics over electronics in signal transmission is inherent parallelism, which allows for the simultaneous transmission of multiple channels over the same (e.g., a single) fiber, optical amplifier, filter, etc., thereby dramatically reducing communication cost.

However, the rapid accumulation of various propagation impairments (e.g., fading, scattering, and diffraction for free-space optical connections and amplified spontaneous emission, chromatic, polarization-mode dispersion, and crosstalk for fiber-optic links), requires frequent termination of these links by optical detectors, as well as subsequent electronic regeneration and retransmission of the signals by modulated laser sources. This so-called opto-electro-optical (OEO) regeneration is complex, bulky, power-hungry, and extremely expensive, especially for high-capacity optical links containing WDM channels, where separate regenerators are required for each channel.

SUMMARY

One implementation of the present disclosure is an all-optical signal processor that includes one or more input ports configured to receive one or more optical signal channels; a first nonlinear optical processor configured to receive an input signal from the one or more input ports, the first nonlinear optical processor including one or more sections of a first nonlinear medium, where the input signal to the first nonlinear optical processor has a nonlinear relationship with an output signal of the first nonlinear optical processor; an optical phase conjugator optically configured to receive the output signal of the first nonlinear optical processor, a second nonlinear optical processor configured to receive an output signal from the optical phase conjugator, the second nonlinear optical processor including one or more sections of a second nonlinear medium, where the output signal from the optical phase conjugator received by the second nonlinear optical processor has a nonlinear relationship with an output signal of the second nonlinear optical processor; and one or more output ports configured to receive the output signal from the second nonlinear optical processor.

In some implementations, at least one of the one or more input ports is configured to receive multiple wavelength-division-multiplexed (WDM) channels.

In some implementations, the all-optical signal processor performs 2R regeneration of the one or more optical signal channels, where 2R regeneration includes re-amplification and nonlinear optical reshaping of a probability density function of input signals received from the one or more optical signal channels.

In some implementations, at least one of the first nonlinear medium or the second nonlinear medium is configured to retain intra-channel nonlinear-optical effects.

In some implementations, at least one of the first nonlinear medium or the second nonlinear medium is further configured to suppress nonlinear interactions among a plurality of wavelength-division-multiplexed (WDM) channels, where the plurality of WDM channels are received by at least one port of the one or more input ports.

In some implementations, phase noise arising from nonlinear amplitude-to-phase noise transfer in the first nonlinear optical processor is substantially compensated by the second nonlinear optical processor.

In some implementations, the one or more optical signal channels provide at least a first optical signal and a second optical signal, where a power level of the first optical signal is greater than a power level of the second optical signal.

In some implementations, at least one of the first nonlinear optical processor or the second nonlinear optical processor is configured to invert the power levels of the first and second signals.

In some implementations, at least one of the first nonlinear medium and the second nonlinear medium is configured to spectrally broaden the one or more optical signal channels.

In some implementations, at least one of the first nonlinear medium and the second nonlinear medium is further configured to suppress interactions among the one or more optical signal channels.

In some implementations, at least one of the first nonlinear optical processor or the second nonlinear optical processor includes an optical bandpass filter.

In some implementations, the optical bandpass filter is a periodic optical bandpass filter.

In some implementations, at least one of the first nonlinear optical processor or the second nonlinear optical processor includes a Mamyshev 2R regenerator.

In some implementations, at least one of the first nonlinear optical processor or the second nonlinear optical processor includes a nonlinear optical loop mirror (NOLM).

In some implementations, the NOLM is imbalanced by one or more of an input/output fiber coupler, an asymmetrically placed amplifier, an asymmetrically placed attenuator, a directional attenuator, a directional amplifier, or an asymmetrically placed dispersive element.

In some implementations, at least one of the first nonlinear medium and the second nonlinear medium includes at least one section of highly nonlinear material and at least one periodic group-delay device (PGDD).

In some implementations, in each of the section of first nonlinear medium and the second of second nonlinear medium, a group delay is accumulated between center frequencies of adjacent wavelength-division-multiplexed (WDM) channels, where an absolute value of the group delay accumulated between the center frequencies of the adjacent WDM channels is substantially larger than an absolute value of the group delay accumulated between any two frequency components of adjacent channels.

Another implementation of the present disclosure is an all-optical signal processor that includes one or more input ports configured to receive one or more optical signal channels; a nonlinear optical processor configured to receive an input signal from the one or more input ports, the nonlinear optical processor comprising one or more sections of a nonlinear medium, wherein the input signal to the nonlinear optical processor has a nonlinear relationship with an output signal of the nonlinear optical processor; an optical phase conjugator optically configured to receive the output signal of the nonlinear optical processor, wherein the optical phase conjugator is configured to generate a conjugated signal from the output signal of the nonlinear optical processor by performing at least one of: i) complex conjugation of an electric field of the output signal of the nonlinear optical processor, or ii) inversion of an optical spectrum of the output signal of the nonlinear optical processor, wherein the conjugated signal is passed back through the nonlinear optical processor and therefore co-propagates or counter-propagates with the input signal to the nonlinear optical processor; and one or more output ports configured to receive the conjugated signal after passing back through the nonlinear optical processor.

In some implementations, the input signal to the nonlinear optical processor and the conjugated signal are combined or separated by one of: a wavelength band splitter/combiner; wavelength-division multiplexing (WDM) coupler; an optical interleaver/de-interleaver; an optical circulator; or a programmable optical filter.

In some implementations, the all-optical signal processor further includes an optical amplifier, wherein the conjugated signal output by the optical phase conjugator is amplified by the optical amplifier before being passed back through the nonlinear optical processor.

In some implementations, the optical amplifier is further configured to amplify the input signal to the nonlinear optical processor.

In some implementations, the optical amplifier further amplifies one or more pump beams.

In some implementations, the all-optical signal processor further includes a pump add/drop multiplexer, wherein one or more pump beams are added or dropped using the pump add/drop multiplexer.

In some implementations, the pump add/drop multiplexer comprises an optical circulator or a fiber Bragg grating (FBG).

In some implementations, the all-optical signal processor further includes one or more optical bandpass filters (OBPFs) or periodic OBPFs to filter at least one of the input signal or the conjugated signal.

Additional features will be set forth, in part, in the description which follows or may be learned by practice. The features will be realized and attained by means of the elements and combinations particularly pointed out in the appended claims. It is to be understood that both the foregoing general description and the following detailed description are exemplary and explanatory only and are not restrictive, as claimed.

Figure 1:
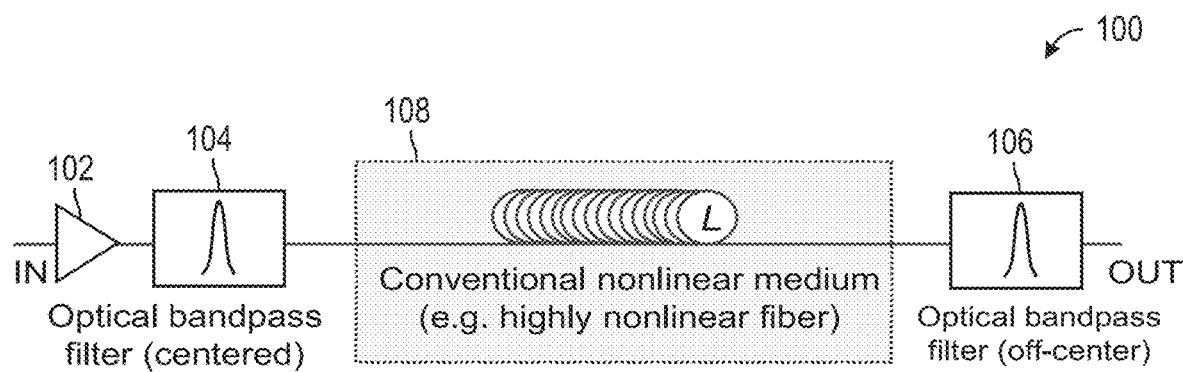
FIG. 1 is a diagram of a single-channel all-optical regenerator, according to some implementations.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the figures, various configurations of an all-optical phase-preserving signal amplitude processor are shown. In at least one of the configurations shown, the all-optical phase-preserving signal amplitude processor includes three "stages" for processing optical signals, including first and second nonlinear optical processing stages separated by an optical phase conjugator. In some implementations, the first nonlinear optical processing stage performs partial regeneration and/or nonlinear noise transfer from amplitude to phase of the signal. The modified optical signal is then passed through the optical phase conjugator which performs complex conjugation of an electric field of the output signal of the first nonlinear optical processor and/or inverts an optical spectrum of the optical signal. The second nonlinear optical processing stage can then bring any phase fluctuations due to the first nonlinear optical processing stage and/or the optical phase conjugator back to zero. In this regard, each nonlinear optical processor could be an all-optical 2R regenerator.

In other configurations described herein, the two nonlinear optical processors or "nonlinear optical processing stages" can be implemented using a single nonlinear optical processor through which the original signal and the phase-conjugated signal (also known as idler) share propagation. Thus, the all-optical phase-preserving signal amplitude processor may include just a single nonlinear optical processor to perform the functions mentioned above. Without a separate second nonlinear optical processor, cost, space, and power consumption could be further reduced (e.g., by up to half that of the configurations described above that utilize two nonlinear optical processors). In this regard, certain nonlinear optical processors—such as the Mamyshev 2R regenerator are compatible with bidirectional propagation of independent signals.

Regardless of the particular configuration, the all-optical phase-preserving signal amplitude processor described herein is notably smaller, less expensive to manufacture, and may consume less power when compared to existing optical signal processors. In some implementations, the all-optical phase-preserving signal amplitude processor is compatible with mobile and solar-powered operation. In some ways, the all-optical phase-preserving signal amplitude processor(s) described herein may be less complex than other devices, leading to increased reliability. In some implementations, the all-optical phase-preserving signal amplitude processor provides bit-rate flexibility (e.g., a single device can handle multiple bit rates) and may potentially enable all-optical burst- and packet-switched networking, which could result in dramatic simplification of network management and subsequent end-user costs.

Example applications for the all-optical phase-preserving signal amplitude processor described herein include long-haul and ultra-long-haul fiber communications (e.g., one processor per fiber every hundred-to-several-hundred kilometers), metropolitan-area networks (e.g., one processor per ingress/egress port per node), satellite optical networks (e.g., one processor per input port per satellite), scalable and survivable war-theater networks (e.g., one processor per unmanned aerial vehicle (UAV), piloted aircraft, small ship, tank or armored vehicle), extending secure line-of sight communications in ground combat (e.g., one processor per platoon), intra-aircraft and intra-ship signal delivery and processing (e.g., one processor per node), extending the range and capacity of board-to-board interconnects in super-computer networks (e.g., one processor per board), and more. Additional aspects and features of the aforementioned all-optical phase-preserving signal amplitude processor are described in greater detail below.

Overview of Optical Regenerators

Referring to FIG. 1, a diagram of a single-channel all-optical regenerator 100 is shown, according to some implementations. In particular, regenerator 100 may be a Mamyshev 2R regenerator. Regenerator 100 is shown to include an input amplifier 102, which boosts the power of an input signal. In some implementations, input amplifier 102 is a high-power erbium doped fiber amplifier (HP-EDFA). As shown, regenerator 100 further includes an input filter 104 and an output filter 106, which may both be optical bandpass filters. In particular, input and output filters 104, 106 may be configured to filter out (e.g., reject) out-of-hand spontaneous emissions. Notably, in some implementations, input filter 104 may be centered on the signal channel while output filter 106 may be off-center. Between input and output filters 104, 106, regenerator 100 is shown to include a nonlinear medium 108, which may be a highly nonlinear fiber (e.g., highly nonlinear silica fiber (HNLF)). As described herein, a Mamyshev 2R regenerator (e.g., regenerator 100) operates on the principle of spectral broadening by self-phase modulation, followed by optical filtering (e.g., by output filter 106). "2R," as used throughout the present disclosure, refers to "re-amplification and re-shaping." As shown, the Mamyshev 2R scheme was originally designed for conventional continuous highly-nonlinear fiber (HNLF). In some implementations, a portion of a self-phase modulation (SPM)-broadened spectrum is selected by an off-center optical bandpass filter—in this case, output filter 106—which rejects noise (e.g., noise of input 'zero' symbols, which is confined to the width of an input spectrum), and which stabilizes a power level of output data (e.g., 'one' symbols). Specifically, the amplitude noise of input cones' translates into fluctuations of SPM-broadened spectrum width, whereas a height of the spectrum (and, therefore, a magnitude of output 'ones') stays constant.

Figure 2A:
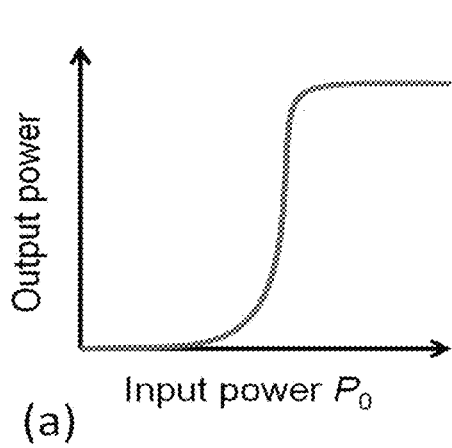
FIGS. 2A and 2B are example graphs of input/output power curves for an ideal 2R regenerator and a Mamyshev 2R regenerator, respectively, according to some implementations.
Figure 2B:
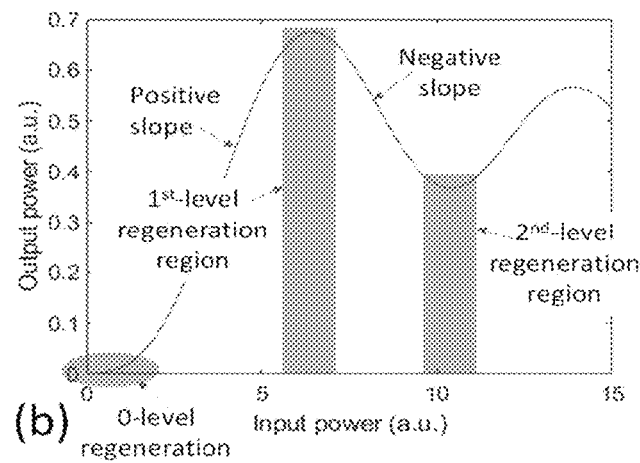

With reference to FIG. 2A, it will be appreciated that an "ideal" 2R regenerator should have a nonlinear, threshold-like input/output power transfer curve. However, as shown in FIG. 2B, a real regenerator may have a slightly different curve. Specifically, FIG. 2B shows an example input/output power curve for a Mamyshev 2R regenerator with dispersionless fiber. Any region of the curve that has small slope (e.g., vicinities of minima and maxima) can be used for regeneration. For example, in FIG. 2B, shaded areas indicate regeneration regions available for three power levels of an input signal. In this example, the $0^{th}$ and first levels are on a positive-slope side of the curve, hence their powers retain their relative positions. However, the first and second power levels are on the negative slope, hence the second power level at the output will be lower than the first power level (e.g., their power positions will be inverted). Such inversion functionality, while not necessary for 2R regenerators, can be used for other types of signal processing (e.g., data format conversion).

Figure 3:
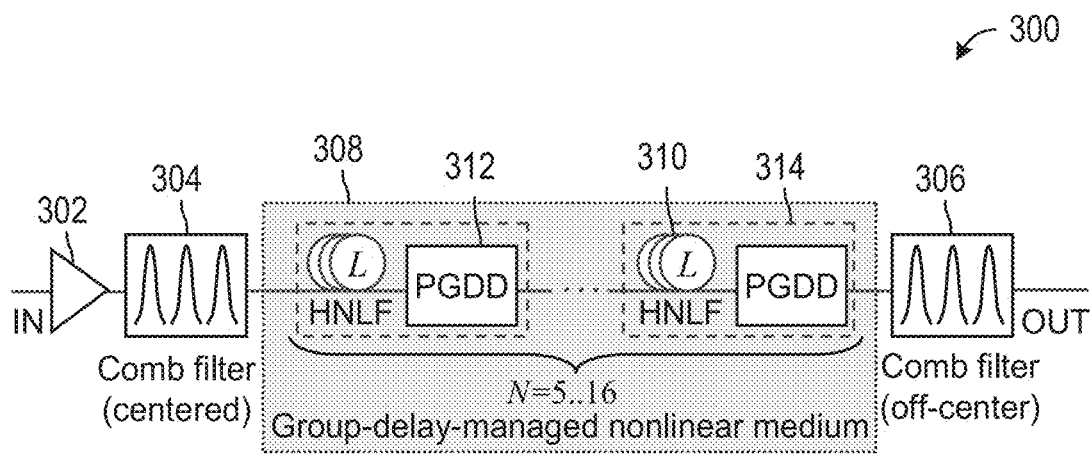
FIG. 3 is a diagram of a multi-channel nonlinear optical processor, according to some implementations.

It will be appreciated, however, that regenerator 100 is limited to only a single channel, and therefore is not suitable for simultaneous transmission of multiple channels. Thus, to handle multi-channel transmissions, a multi-channel regenerator that utilizes a modified Mamyshev scheme to suppress undesirable inter-channel nonlinearities (e.g., cross-phase modulation (XPM) and four-wave mixing (FWM)) while accumulating a large amount of beneficial intra-channel nonlinearity (e.g., self-phase modulation (SPM)) by employing an artificial group-delay-managed (GDM) nonlinear medium with tailored nonlinear and dispersion properties favoring SPM and reducing XPM and FWM is also described herein. FIG. 3 shows a diagram of one such multi-channel nonlinear optical processor 300, according to some implementations. In some implementations, optical processor 300 is a multi-channel all-optical signal processor as described in U.S. Pat. No. 7,505,690, filed Jan. 28, 2005, or a compact multi-port optical signal processor as described in U.S. Pat. No. 8,340,484, filed Jan. 5, 2010, both of which are incorporated herein by reference in their entireties.

As shown, optical processor 300 is generally based on the above-mentioned Mamyshev 2R regeneration scheme. Accordingly, optical processor 300 may be generally referred to as a modified Mamyshev 2R regenerator or a multi-channel Mamyshev 2R regenerator. Unlike regenerator 100, optical processor 300 is configured for simultaneous regeneration of multiple wavelength division multiplexing (WDM) channels. Specifically, optical processor 300 takes advantage of optical parallelism to implement a 2R (re-amplification, re-shaping) regenerating function for all WDM channels simultaneously. To achieve multi-channel operation, undesirable inter-channel nonlinearities (e.g., XPM and FWM) should be repressed while retaining a significant amount of beneficial intra-channel nonlinearity (e.g., SPM), as mentioned above.

Figure 4:
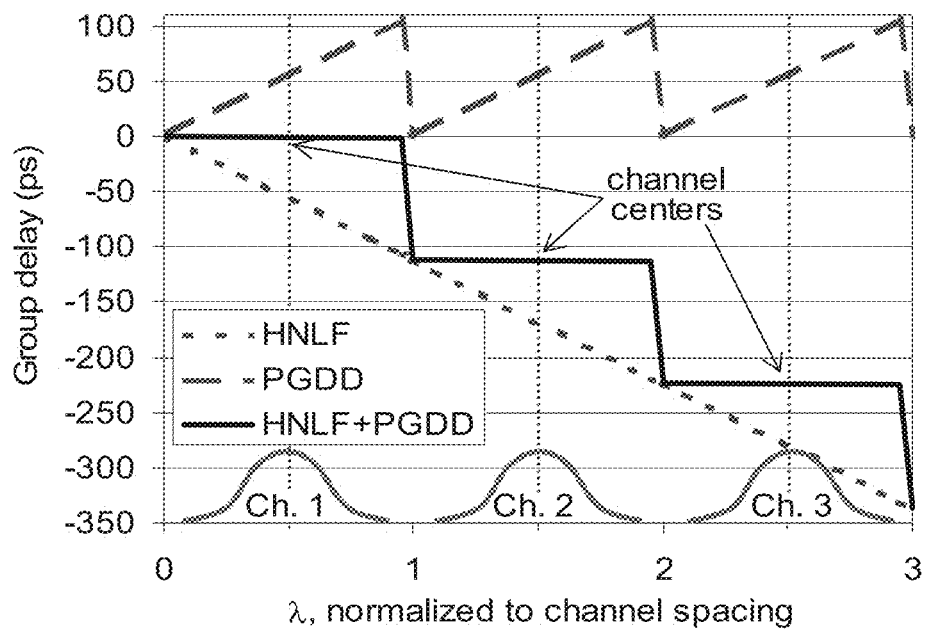
FIG. 4 is an example graph illustrating a group delay spectrum for a section of nonlinear medium, according to some implementations.

Like regenerator 100, optical processor 300 is shown to include an input amplifier 302, which boosts the power of an input signal. In some implementations, input amplifier 302 is an HP-EDFA. Following input amplifier 302 is an input comb filter 304, which may be centered. Optical processor 300 may also include an output comb filter 306, which may be off-center. In some implementations, output comb filter 306 is a periodic optical bandpass filter. Between input and output comb filters 304, 306 is a GDM nonlinear medium 308 which consists of multiple sections of highly dispersive HNLF 310 separated by periodic group-delay devices (PGDDs) 312. Each section of HNLF 310 and PDGG 312 forms a "cell" 314. Each PGDD may have a periodic saw-tooth-like group-delay spectrum, such that each cell 314 has a staircase-like group delay spectrum, as shown in FIG. 4. In particular, FIG. 4 shows a group-delay spectra of one section of HNLF 310 as the bottom-most dashed line, one PGDD 312 as the top-most dashed line, and one HNLF+PGDD unit cell (e.g., cell 314) as the central solid line. The positions of three example data channels (e.g., CH1, CH2, CH3) are shown at the bottom of the graph as solid lines. As shown, the net group-delay spectrum of one cell (e.g., cell 314) has a staircase-like shape, leading to different propagation velocities among the different channels, while keeping the velocities of all spectral components within each channel very similar.

Thus, in GDM nonlinear medium 308, different WDM channels propagate with different group velocities, whereas various frequency components of the same channel travel at the same velocity. High phase- and group-velocity mismatch between the channels (inter-channel dispersion) dramatically suppresses FWM and XPM. At the same time, dispersion within each channel's band is kept small to preserve the pulse integrity for efficient spectral broadening by SPM. Although GDM medium 308 can be implemented using off-the-shelf PGDDs, for practical use, PGDDs 312 should be compact and have low insertion loss. Highly-nonlinear silicon-nitride or chalcogenide waveguides and microring networks have a potential for integrating such a GDM medium entirely on a chip. However, at present, MIT is unmatched in terms of high nonlinearity/loss ratio ($\gamma/\alpha$). Therefore, in some implementations, HNLF can be used for nonlinear elements and PGDDs can be implemented on a low-loss planar lightwave circuit chip; although, it should be appreciated that optical processor 300 is not limited to just, these components.

Over the last decade, however, the telecom industry's interest has shifted from intensity-modulation direct detection (IMDD) data formats to more advanced modulation formats, where the information is encoded not only into amplitude but also in the phase of the wave (e.g., quadrature phase-shift keying or QPSK, M-PSK, quadrature amplitude modulation such as 16-QAM, starM-QAM formats, etc.), which allows for increased link capacity without requiring larger bandwidth. It will be appreciated that Mamyshev 2R regenerators (e.g., regenerator 100) tend to distort the phase of an incoming signal; hence, these types of regenerators are not desired for advanced modulation formats, owing to strong nonlinear-optical transfer of noise from amplitude to phase (e.g., known as that Gordon-Mollenauer effect). A few other types of all-optical 2R regenerators, such as those based on nonlinear-optical loop mirrors (NOLMs), or nonlinear amplifying loop mirrors (NALMs), can regenerate amplitude without disturbing the phase (known as phase-preserving amplitude regenerators, or PPARs). As a result, PPARs can work with the aforementioned advanced formats and, in principle, are compatible with a GDM nonlinear medium (e.g., GDM nonlinear medium 308) for multi-channel operation.

Figure 5:
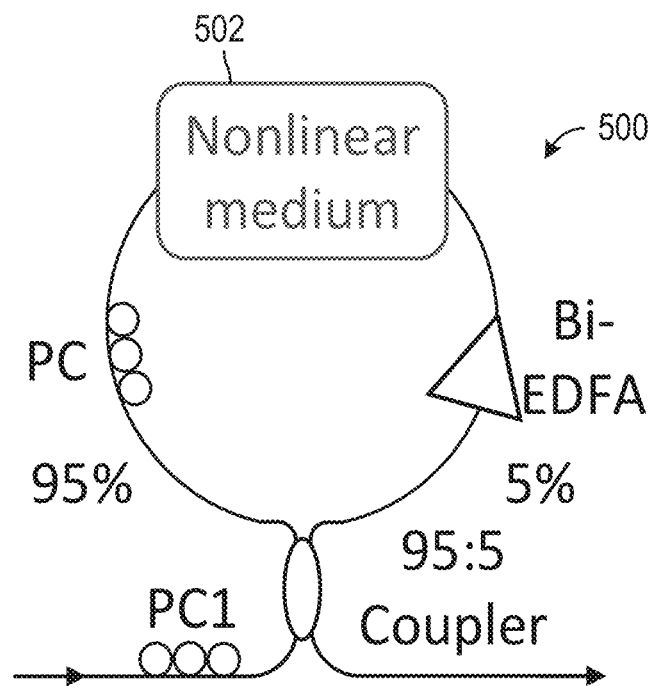
FIG. 5 is a diagram of a nonlinear amplifying loop mirror (NALM), according to some implementations.

Referring now FIG. 5, a diagram of an example NALM 500 is shown, according to some implementations. In some implementations, NALM 500 is imbalanced, e.g., by an input/output fiber coupler, an asymmetrically placed bi-directional amplifier (Bi-EDFA), an asymmetrically placed attenuator, a directional attenuator, a directional amplifier, or an asymmetrically placed dispersive element. NALM 500 further includes a nonlinear medium 502, such as highly nonlinear fiber. In some implementations, NOLM- and NALM-based regenerators, such as NALM 500, can be configured as PPARs and can potentially accommodate multiple regenerating levels. Replacing nonlinear medium 502 with the GDM medium described above in FIG. 3 (e.g., GDM medium 308) can allow NALM 500 to process multiple channels simultaneously. However, the fiber-loop nature of these regenerators makes them very susceptible to phase noise from Rayleigh scattering and reflections from any discontinuities in the loop. Hence, NOLMs and NALMs have not been widely adapted for multi-channel regeneration of advanced modulation formats.

Figure 6:
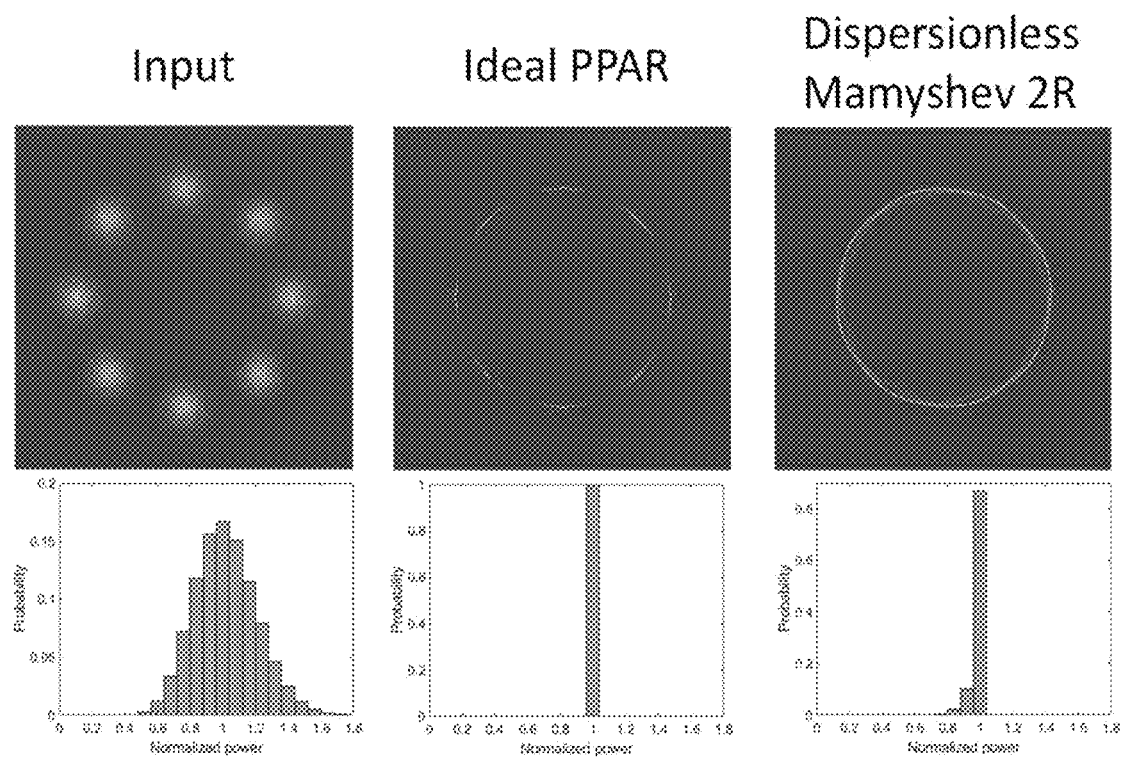
FIG. 6 is a plurality of example constellation diagrams and corresponding power histograms for an input signal, an ideal phase-preserving amplitude regenerator (PPAR), and a dispersionless Mamyshev 2R regenerator, according to some implementations.

As mentioned above, a problem with practical use of Mamyshev 2R regenerators is nonlinear amplitude-to-phase noise transfer, degrading any modulation format that uses phase encoding. For example, a simulation for 8-PSK-modulated data is shown in FIG. 6, according to some implementations. Specifically, FIG. 6 shows simulated constellation diagrams (i.e., color-coded histograms of complex-valued electric fields) of 8-PSK modulation formats at the input (left) and output of an ideal PPAR (middle) and dispersion-less Mamyshev 2R regenerator (right). Corresponding power histograms are shown in the bottom row. The average nonlinear phase shift at the peak of RZ pulse in Mamyshev 2R case is 2.41. As shown, while the amplitude is well regenerated by the dispersion-less Mamyshev 2R regenerator, the phase levels become overlapped and virtually undistinguishable.

All-Optical Multi-Channel Signal Amplitude Processor

Figure 7:
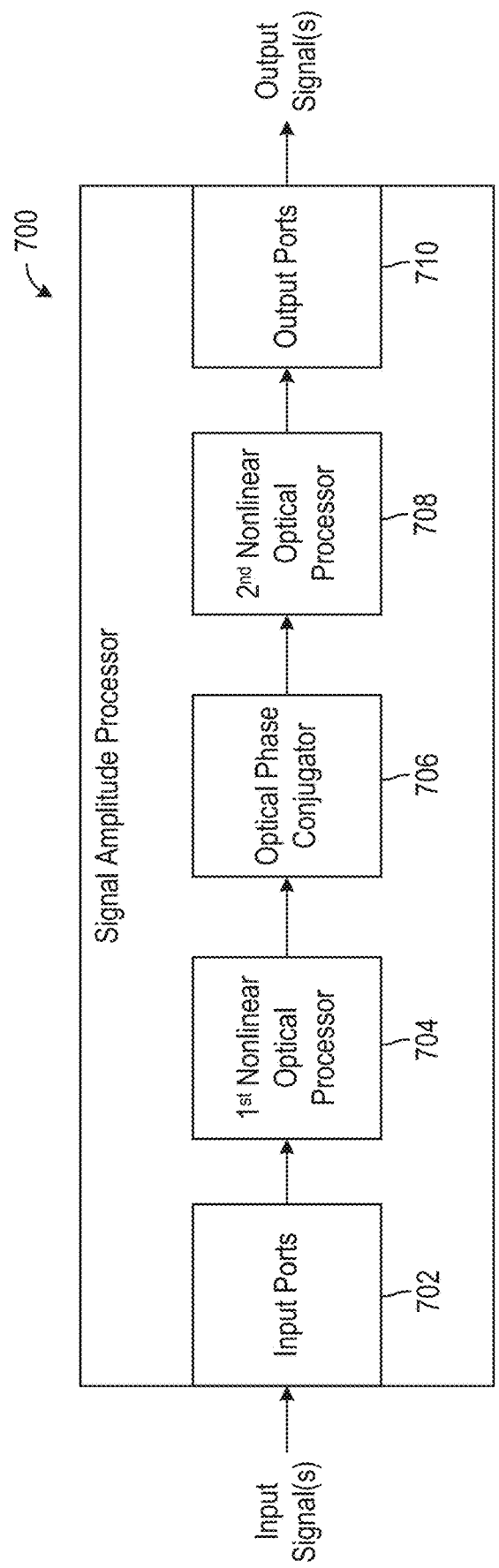
FIG. 7 is a block diagram of an all-optical signal amplitude processor, according to some implementations.

Referring now to FIG. 7, a block diagram of an all-optical, multi-channel signal amplitude processor 700 is shown, according to some implementations. As described herein, processor 700 may be configured for processing of multiple input channels simultaneously. More specifically, processor 700 performs 2R regeneration of one or more optical signal channels (e.g., inputs). As described above, 2R regeneration generally includes re-amplification and nonlinear optical reshaping of a probability density function of input signals received from the one or more optical signal channels. Notably, processor 700 addresses certain drawbacks described above with other electro-optical and optical regenerators and processors (e.g., regenerator 100, optical processor 300, NALM 500).

Processor 700 is first shown to include input port(s) 702 which receive input signals from one or more optical channels. In some implementations, at least one of input port(s) 702 is configured to receive multiple WDM channels. In some implementations, the multiple WDM channels may provide at least a first optical signal and a second optical signal, and the power level of the first optical signal may be greater than a power level of the second signal.

As shown, instead of a single nonlinear-optical processor, processor 700 includes two nonlinear-optical processing stages with a device performing optical phase conjugation (OPC), also known as spectral inversion, positioned between them. In particular, processor 700 includes a first nonlinear optical processor stage 704. In some implementations, first nonlinear optical processor stage 704 is a Mamyshev 2R, such as regenerator 100, or a modified Mamyshev 2R regenerator, such as optical processor 300. In some implementations, first nonlinear optical processor stage 704 is a NOLM or NALM, such as NALM 500. In some such implementations, the NOLM or NALM is imbalanced by one or more of an input/output fiber coupler, an asymmetrically placed amplifier, an asymmetrically placed attenuator, a directional attenuator, a directional amplifier, or an asymmetrically placed dispersive element, as described above with respect to FIG. 5. In some implementations, first nonlinear optical processor stage 704 may be configured to perform partial amplitude regeneration of a signal—in particular, a signal received from input port(s) 702. In some implementations, first nonlinear optical processor stage 704 also causes nonlinear transfer of noise from amplitude to phase, where positive amplitude fluctuations translate into positive phase shifts. In other words, the input to first nonlinear optical processor stage 704 (e.g., an optical signal) generally has a nonlinear relationship to an output of first nonlinear optical processor stage 704. In some implementations, this nonlinear relationship is due to the nonlinear medium (e.g., GDM medium 308) within first nonlinear optical processor stage 704. For example, as described above with respect to FIG. 3, first nonlinear optical processor stage 704 may contain one or more sections of nonlinear medium (e.g., cells 314). In some implementations, first nonlinear optical processor stage 704 includes an optical bandpass filter (e.g., output comb filter 306) at its output, which locks in the partial amplitude regeneration. In some implementations, the output optical bandpass filter is a periodic optical bandpass filter.

Processor 700 is shown to further include a second nonlinear optical processor stage 708. In some implementations, second nonlinear optical processor stage 708 is a Mamyshev 2R, such as regenerator 100, or a modified Mamyshev 2R regenerator, such as optical processor 300. In some implementations, second nonlinear optical processor stage 708 is a NOLM or NALM, such as NALM 500. In some such implementations, the NOLM or NALM is imbalanced by one or more of an input/output fiber coupler, an asymmetrically placed amplifier, an asymmetrically placed attenuator, a directional attenuator, a directional amplifier, or an asymmetrically placed dispersive element, as described above with respect to FIG. 5. Like, first nonlinear optical processor stage 704, second nonlinear optical processor stage 708 may cause nonlinear transfer of noise from amplitude to phase, in some implementations (e.g., the input to second nonlinear optical processor stage 708 generally has a nonlinear relationship to an output of second nonlinear optical processor stage 708). In some implementations, this nonlinear relationship is due to the nonlinear medium (e.g., GDM medium 308) within second nonlinear optical processor stage 708. Accordingly, in some implementations, second nonlinear optical processor stage 708 may contain one or more sections of nonlinear medium (e.g., cells 314). In some implementations, second nonlinear optical processor stage 708 is configured to compensate for phase noise arising from nonlinear amplitude-to-phase noise transfer in first nonlinear optical processor stage 704. In some implementations, second nonlinear optical processor stage 708 includes an optical bandpass filter (e.g., output comb filter 306) at its output. In some implementations, the output optical bandpass filter is a periodic optical bandpass filter.

As described herein, both first nonlinear optical processor stage 704 and second nonlinear optical processor stage 708 may be multi-channel nonlinear optical processors. Accordingly, in some implementations, both first nonlinear optical processor stage 704 and second nonlinear optical processor stage 708 are, or include, one of processor 300. As mentioned above, each of first nonlinear optical processor stage 704 and second nonlinear optical processor stage 708 generally include one or more sections of nonlinear medium, which may be the same nonlinear medium (e.g., GDM medium 308) or different mediums. As described above, each section of nonlinear medium generally includes a highly nonlinear material (e.g., GDM or HLNF) and at least one PGDD. In some implementations, where input signals are at different power levels (e.g., a first input signal is at a higher power level than a second input signal), at least one of first nonlinear optical processor stage 704 or second nonlinear optical processor stage 708 is configured to invert the power levels of the signals.

The nonlinear medium of one or both processor stages can impart, a number of different characteristics and/or effects. For example, the nonlinear medium can retain intra-channel nonlinear-optical effects. In another example, the nonlinear medium of one or both processor stages suppresses nonlinear interactions among a plurality of WDM channels. In yet another example, the nonlinear medium of one or both processor stages spectrally broadens the one or more optical signal channels. In yet another example, the nonlinear medium of one or both processor stages suppresses interactions among the one or more optical signal channels. In some implementations, a group delay is accumulated between center frequencies of adjacent WDM channels in one or more of the nonlinear medium sections of first nonlinear optical processor stage 704 and second nonlinear optical processor stage 708. In some such implementations, an absolute value of the group delay accumulated between the center frequencies of the adjacent WDM channels may be substantially larger than an absolute value of the group delay accumulated between any two frequency components of either one of the adjacent channels. Processor 700 is also shown to include output port(s) 710 which receive signals from second nonlinear optical processor stage 708 after having been fully processed.

Between first nonlinear optical processor stage 704 and second nonlinear optical processor stage 708 is an OPC 706. Accordingly, OPC 706 generally receives signals from first nonlinear optical processor stage 704 after initial processing and passes signals to second nonlinear optical processor stage 708. In some implementations, OPC 706 is configured to perform complex conjugation of an electric field of the output signal of first nonlinear optical processor stage 704. In some implementations, OPC 706 is configured to invert an optical spectrum of the output signal of first nonlinear optical processor stage 704. In some implementations, OPC 706 causes positive phase fluctuations (e.g., due to positive power fluctuations) to become negative, such that second nonlinear optical processor stage 708 can bring these phase fluctuations back to zero due to subsequent accumulation of nonlinear phase shift. Conditions under which this occurs can include:

$$\gamma \Delta P_1 L_1 = \gamma \Delta P_2 L_2$$

-continued and/or $$\frac{\Delta P_1}{\Delta P_2} = \frac{\gamma_2 L_2}{\gamma_1 L_1}$$

where γ is the nonlinear constant, ΔP is the power fluctuation, and L is the effective length of nonlinear medium marked by a subscript (e.g., 1 or 2).

It will be appreciated that the aforementioned functionality of OPC 706 ensures that nonlinear phase shifts due to power fluctuations in first nonlinear optical processor stage 704 and second nonlinear optical processor stage 708 cancel each other out. In some implementations, a negative slope of the power transfer function of one of the stages (e.g., one of first nonlinear optical processor stage 704 and second nonlinear optical processor stage 708) can be leveraged to effectively achieve negative nonlinear constant γ (i.e., obtain negative phase nonlinear shifts for positive power fluctuations). Thus, OPC 706 is generally configured to cancel nonlinear phase shifts in a strongly nonlinear device (e.g., which relies on high nonlinearity for its optical processing functionality). In some implementations, for M-PSK and starM-QAM modulation formats, there is no need to regenerate zero level; hence the optical bandpass filter at the output of first nonlinear optical processor stage 704 and/or second nonlinear optical processor stage 708 may not be off-centered.

Figure 8:
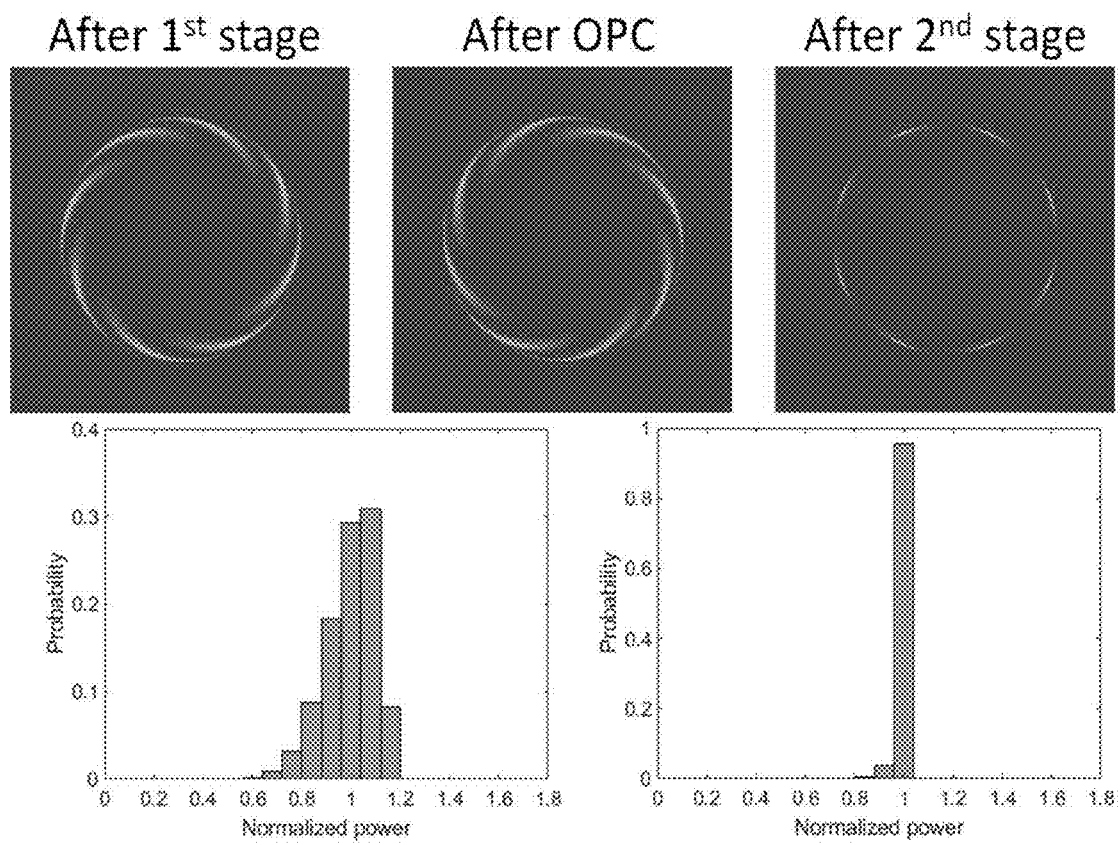
FIG. 8 is a plurality of example constellation diagrams and corresponding power histograms for an input signal that is processed using the all-optical signal amplitude processor of FIG. 7, according to some implementations.

In some implementations, if the average power of the signal and/or parameters of the nonlinear medium of first nonlinear optical processor stage 704 and second nonlinear optical processor stage 708 is selected to satisfy the equations above, or another condition for cancellation of the nonlinear phase noise is met, the output power curve of second nonlinear optical processor stage 708 can closely match the "ideal" curve shown in FIG. 2A. With reference to FIG. 8, a plurality of example constellation diagrams and corresponding power histograms for an input signal that is processed using processor 700 are shown which illustrate this point, according to some implementations. Specifically, FIG. 8 shows simulated constellation diagrams of 8-PSK modulation formats corresponding to an input signal (e.g., the input signal shown in FIG. 5) after first nonlinear optical processor stage 704 (top left), after OPC 706 (top middle), and after second nonlinear optical processor stage 708 (top right). In this example, the average nonlinear phase shift at the peak of RZ pulse is 1.66 for the first stage and 2.9 for the second stage. Corresponding power histograms are shown in the bottom row, which illustrate the outputs of first nonlinear optical processor stage 704 (bottom left) and second nonlinear optical processor stage 708 (bottom right). It is understood that the outputs of first nonlinear optical processor stage 704 and OPC 706 generally have similar power distributions.

In some implementations, processor 700 is fully compatible with WDM operation if the nonlinear media in both first nonlinear optical processor stage 704 and second nonlinear optical processor stage 708 is GDM media (e.g., as described above with respect to FIG. 3). In some implementations, OPC 706 can also be implemented in a multi-channel-compatible way by using optical parametric amplification in an HNLF with low dispersion slope, pumped slightly on the positive side of its zero-dispersion wavelength. In some implementations, OPC 706 can also be implemented in periodically poled lithium niobate waveguides and other nonlinear materials. It should be appreciated, as well, that the operation of processor 700 is not limited to Mamyshev 2R regeneration; rather, the scheme described herein can apply to NOLM or NALM-based regenerators, as well as to XPM-based optical switches, wavelength converters, or logic gates, all-optical data format converters or inverters, etc.

Figure 9:
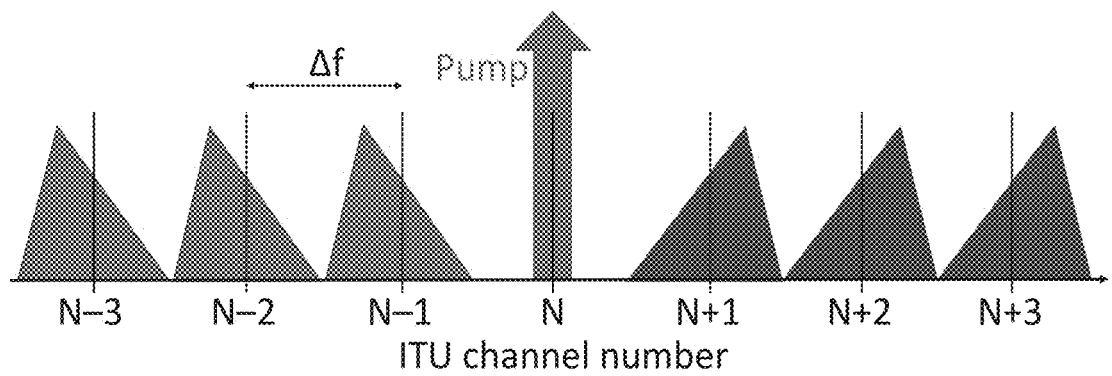
FIGS. 9-10B are example graphs of illustrating optical phase conjugation of multiple wavelength-division-multiplexed (WDM) channels, according to some implementations.
Figure 10A:
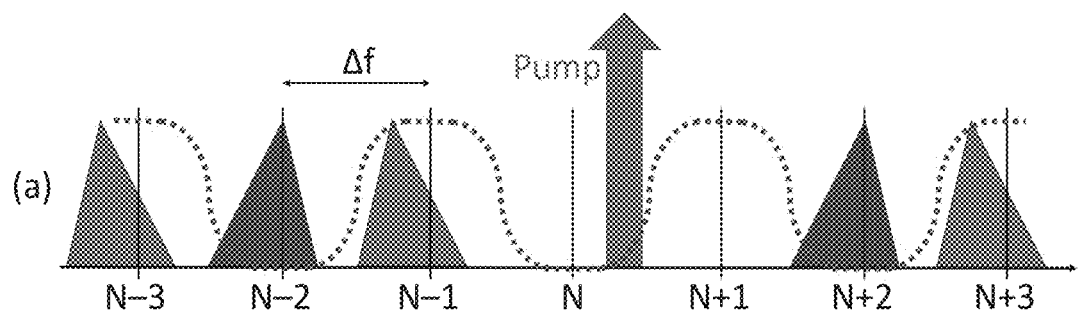
Figure 10B:
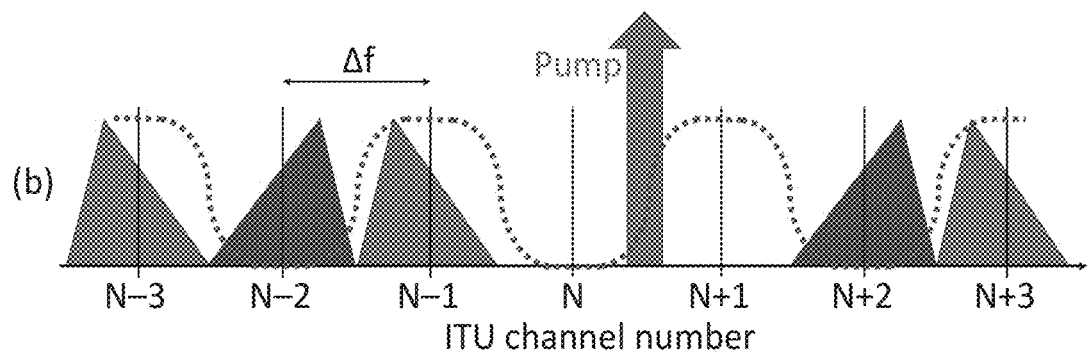

Several examples of how to separate the conjugated idler channels from the input signal channels and the pump are shown in FIGS. 9-10B. For example, FIG. 9 illustrates optical phase conjugation (i.e., spectral inversion) of multiple WDM channels positioned, e.g., on Δf=100 GHz-spaced ITU grid. In this example, the darkly shaded channels represent an input to OPC 706, and the lightly shaded channels represent an output of OPC 706, which can be separated from the input channels and the pump by a low-pass filter. FIG. 10A and FIG. 10B illustrate two examples of alternative channel arrangements, in which input channels are located on both sides of the pump and can be separated from the conjugated channels at the output by an optical interleaver (e.g., a 100-to-200-GHz interleaver, in this example). The transmission function of the interleaver is illustrated with a dashed line.

Additional implementations Using a Single Nonlinear Optical Processor

As has been described in detail, processor 700 generally includes two nonlinear optical processors (e.g., first nonlinear optical processor stage 704 and second nonlinear optical processor stage 708) and an optical phase conjugator (e.g., OPC 706) positioned between them. Each nonlinear optical processor could be an all-optical 2R regenerator, which may require a high-power optical amplifier, nonlinear medium (e.g., possibly a GDM medium for multi-channel operation), and/or optical filters or couplers. As mentioned above, however, removing one of the two nonlinear optical processors would practically halve the cost, space, and power consumption of the all-optical, multi-channel signal amplitude processor. In this regard, variations of processor 700 are described below in which the two nonlinear optical processors are replaced by a single nonlinear optical processor in which both the original signal and the phase-conjugated signal (also known as idler) share propagation.

Figure 11:
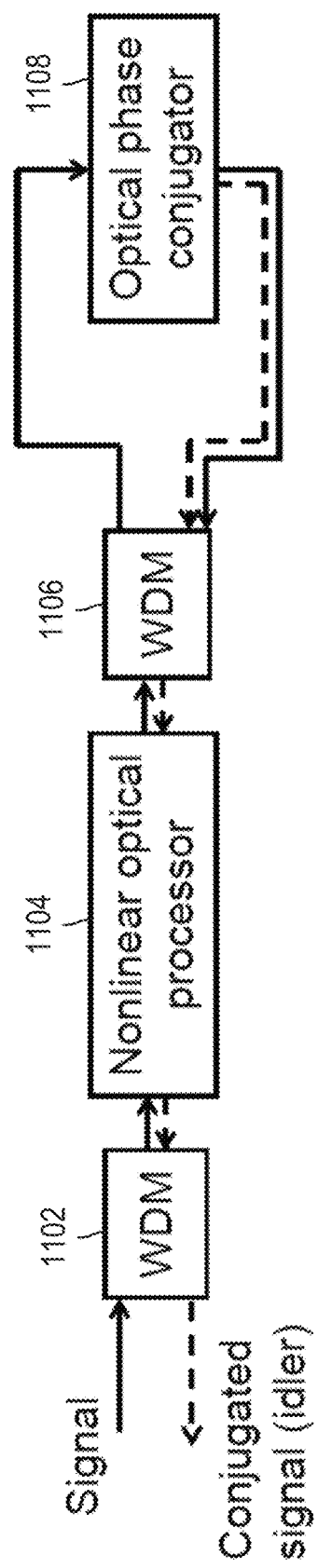
FIGS. 11-14 are diagrams of various additional configurations of the all-optical signal amplitude processor that utilize a single nonlinear optical processor, according to some implementations.

Referring now to FIG. 11, a first variation of the all-op multi-channel signal amplitude processor described herein (e.g., processor 700) is shown. This first variation—shown as all-optical, multi-channel signal amplitude processor 1100—generally utilizes a nonlinear optical processor, such as Mamyshev 2R regenerator, that is compatible with bidirectional propagation of independent signals. Thus, processor 1100 is shown to include only one nonlinear optical processor 1104, which may be the same as, or functionally equivalent to, first nonlinear optical processor stage 704 and/or second nonlinear optical processor stage 708. In other words, nonlinear optical processor 1104 can be a Mamyshev 2R, such as regenerator 100, or a modified Mamyshev 2R regenerator, such as optical processor 300. Processor 1100 is also shown to include a pair of WDM couplers 1102, 1106 for multiplexing and demultiplexing signal and idler beams; however, the number of WDM couplers is not intended to be limiting. WDM couplers 1102, 1106 are described in greater detail below. Likewise, processor 1100 can include an OPC 1108, which may be the same as, or functionally equivalent to, OPC 706 as described above.

During operations, a signal (e.g., a beam) is first received via WDM coupler 1102. After passing through nonlinear optical processor 1104, as shown, the signal then passes through WDM coupler 1106 and OPC 1108. At the output of OPC 1108, the conjugated signal (referred to herein as an idler) and non-conjugated signal are directed to WDM coupler 1106. As mentioned above, WDM coupler 1106 can multiplex and demultiplex the signal and idler beams. It should be noted that, throughout FIGS. 11-15D, an original/received signal is indicated by a solid line, a conjugated signal (referred to herein as an idler) is indicated by a dashed or "broken" line, and pump beams are indicated by dot-dashed lines. Additionally, optional components are identified with dotted borders.

In some implementations, WDM coupler 1106 blocks the non-conjugated signal while allowing the idler to enter nonlinear optical processor 1104. The idler can then travel through nonlinear optical processor 1104 in a direction opposite that of the original signal. Thus, the signal and idler share the same nonlinear optical processor (e.g., nonlinear optical processor 1104) by counter-propagating through it. Counter-propagation significantly reduces any chance of linear or nonlinear interaction (e.g., crosstalk) between the signal and idler beams. Since signal and idler wavelengths are different, WDM coupler 1106 can easily separate or combine them.

To this point, in some implementations where the signal and idler wavelength bands do not overlap (e.g., as shown in FIG. 9), WDM coupler 1106 is a WDM band combiner/splitter. In some implementations where the signal and idler wavelengths are interleaved (e.g., as shown in FIG. 10), WDM coupler 1106 is an optical interleaver/de-interleaver. In either case, a WDM band combiner/splitter and/or an optical interleaver/de-interleaver are inexpensive passive (e.g., not energy consuming) devices with very low insertion losses. In other implementations, WDM coupler WDM coupler 1106 is a programmable filter based on liquid crystal on silicon (LCoS) technology. In some implementations, the counter-propagating signal and idler can alternatively be combined or separated using an optical circulator rather than a WDM coupler. It should be understood that WDM coupler 1102 is generally the same as, or functionally equivalent to, WDM coupler 1106; thus, the preceding description of WDM coupler 1106 is equally applicable to WDM coupler 1102 but is not repeated herein for the sake of brevity.

Figure 12:
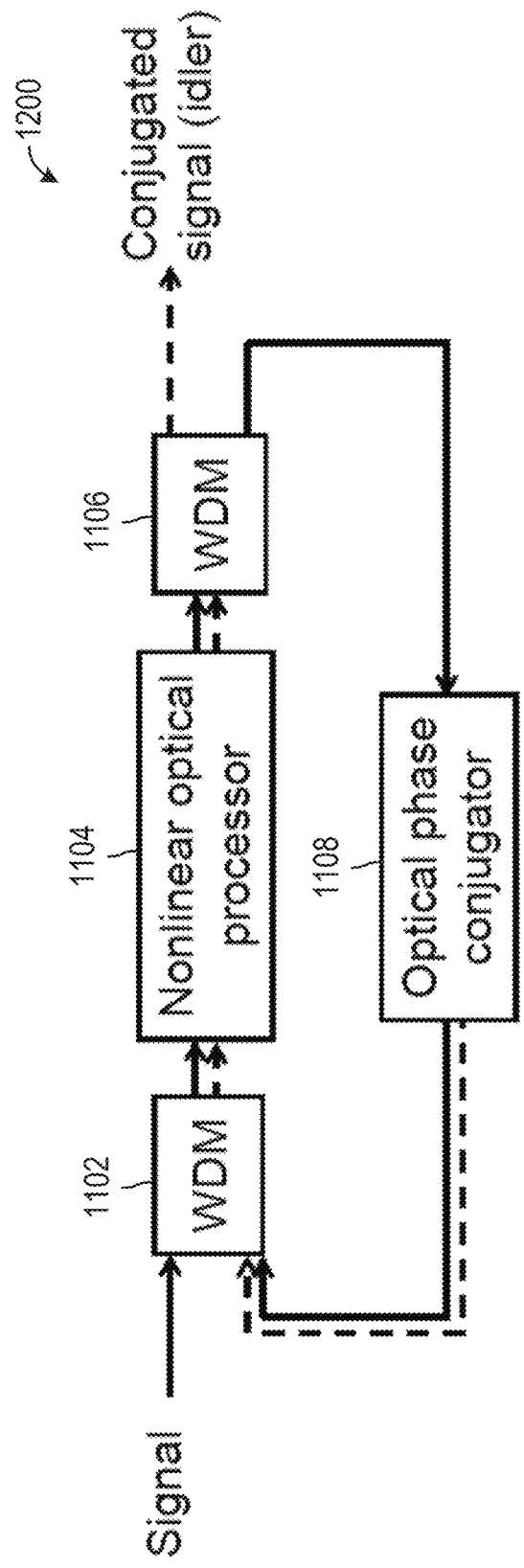

Referring now to FIG. 12, a second variation of the all-optical, multi-channel signal amplitude processor described herein (e.g., processor 700) is shown. In this second variation—shown as all-optical, multi-channel signal amplitude processor 1200 the nonlinear optical processor (e.g., nonlinear optical processor 1104) is a NOLM or other nonlinear optical processor that is not necessarily compatible with bidirectional propagation. In some such implementations, as shown, the signal and idler beams are configured to co-propagate. A co-propagating geometry is more prone to nonlinear signal-idler interaction, but such interaction can be minimized, for example, by employing GDM nonlinear medium inside nonlinear optical processor 1104.

Figure 13:
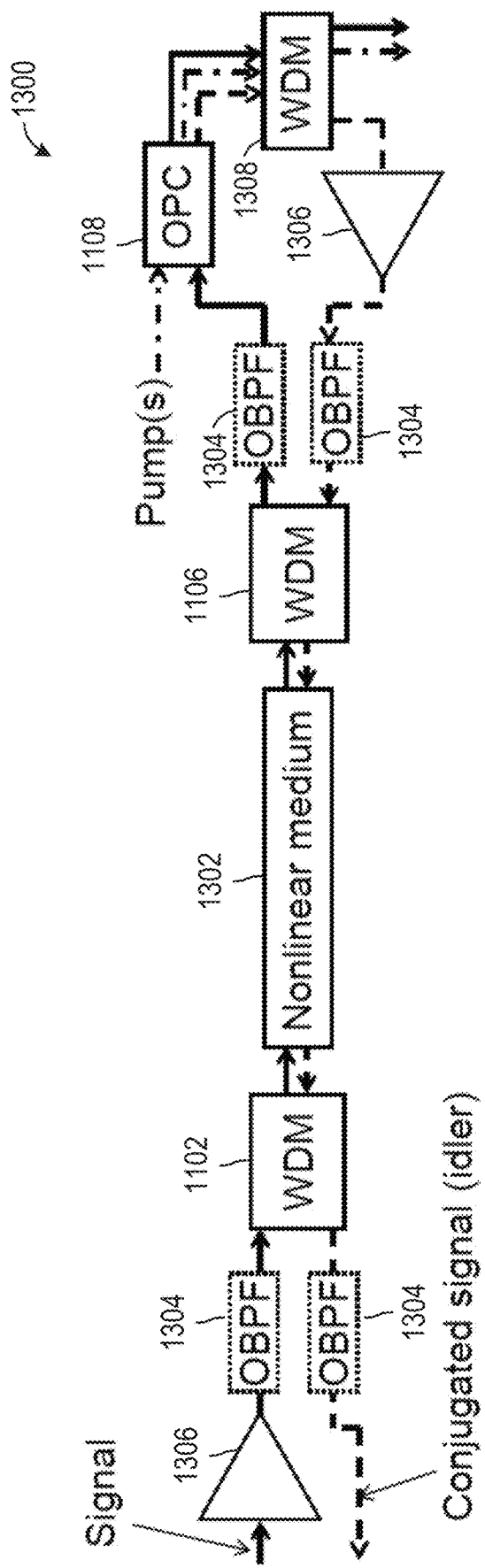

Referring now to FIG. 13, a third variation of the all-optical, multi-channel signal amplitude processor described herein (e.g., processor 700) is shown. In this third variation—shown as all-optical, multi-channel signal amplitude processor 1300—the nonlinear optical processor is, specifically, a Mamyshev 2R regenerator (e.g., optical processor 300). In this configuration, the signal and idler beams counter-propagate in a conventional or GDM nonlinear medium 1302 and are separated or combined by WDM couplers 1102, 1106. In addition, processor 1300 is shown to include optical bandpass filters (OBPFs) 1304 before and after nonlinear medium 1302. However, if the signal and idler wavelengths are interleaved, e.g., as was shown in FIG. 10, then WDM couplers 1102, 1106 can be implemented in the form of optical interleavers/de-interleavers, which also automatically perform periodic optical bandpass filtering of the signals and idlers. In that case, separate OBPFs (e.g., OBPFs 1304) are not included in processor 1300, further simplifying the scheme. In practice, it might still be beneficial to use OBPFs 1304 even in the cause of utilizing optical interleavers/de-interleavers for WDM couplers 1102, 1106, because an optical interleave/de-interleaver may have some linear crosstalk (e.g., leakage) between the signal and idler, which can be suppressed by the additional OBPF stage. In addition, processor 1300 is shown to include a set of high-power optical amplifiers 1306 for amplifying an input signal and/or the idler. In some implementations, at OPC 1108, pump(s) further provide additional pump beams, which can subsequently be filtered out by an additional WDM coupler, shown as WDM coupler 1308. For the purposes of this description, WDM coupler 1308 may generally be implemented using technology similar to one of those described for implementation of WDM couplers 1102 and/or 1106 above.

Figure 14:
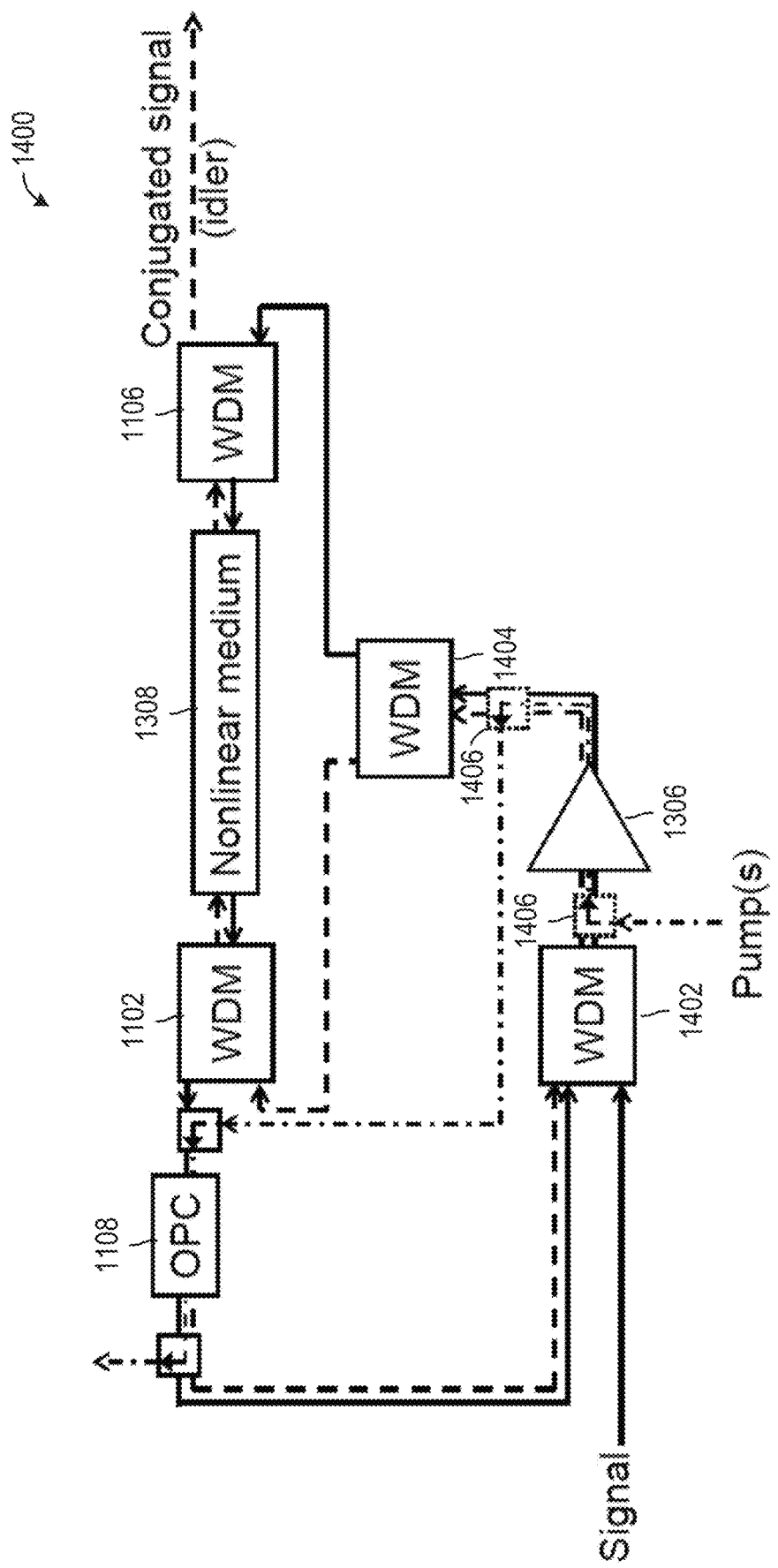

Referring now to FIG. 14, a fourth variation of the all-optical, multi-channel signal amplitude processor described herein (e.g., processor 700) is shown. In this fourth variation—shown as all-optical, multi-channel signal amplitude processor 1400—the nonlinear optical processor is, again, a Mamyshev 2R regenerator (e.g., optical processor 300). Thus, the signal and idler beams counter-propagate in a conventional or GDM nonlinear medium 1302 and are separated or combined by WDM couplers 1102, 1106. It should be understood, however, that some of the most expensive and power-consuming components in processor 1300 (e.g., described above) are high-power optical amplifiers 1306. It is possible to further simplify the device, in turn reducing cost and power consumption, by eliminating one of high-power optical amplifiers 1306 from the configuration shot-vii in FIG. 13. To this point, processor 1400 is shown to include a single one of high-power optical amplifiers 1306 for amplifying both signal and idler beams.

Figure 15B:
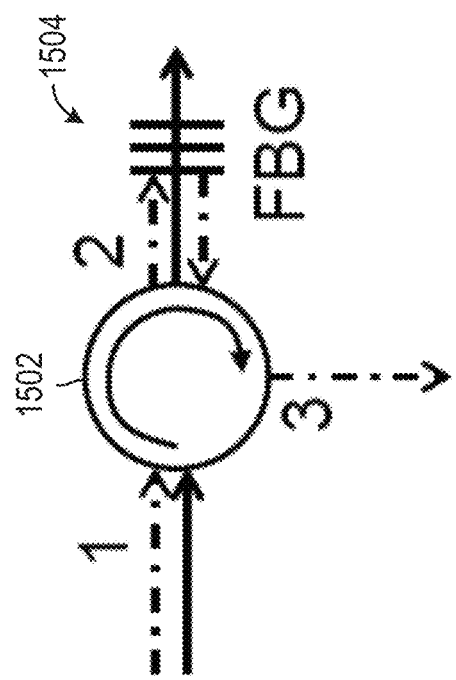
FIGS. 15A-15D are diagrams of pump add and drop multiplexers, according to some implementations.
Figure 15D:
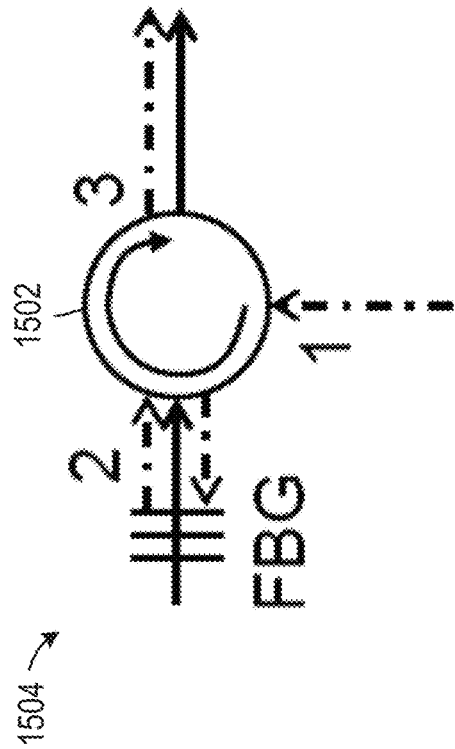
Figure 15A:
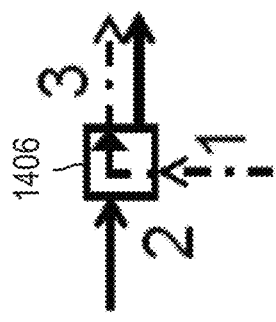
Figure 15C:
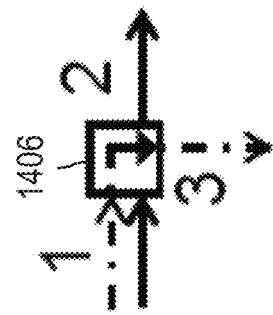

It is also possible to use high-power optical amplifier 1306 (e.g., a single optical amplifier) to boost the pump power. In some such implementations, processor 1400 can further include two or more pump add/drop multiplexers 1406. As shown, one of pump add/drop multiplexers 1406 is posited after a WDM coupler 1402 and a second is positioned before a WDM coupler 1404. FIGS. 15A-15D illustrate examples of narrowband pump add/drop multiplexers, which can be used for pump add/drop multiplexers 1406. Specifically, FIGS. 15A and 15B illustrate a narrowband pump add multiplexer and FIGS. 15C and 15D illustrate a narrowband pump drop multiplexer. In each configuration, the narrowband pump add/drop multiplexers are defined by a combination of a three-port circulator 1502 (circle with an arrow) and a fiber Bragg grating (FBG) 1504. In three-port circulator 1502, light can only propagate from Port 1 to Port 2 and from Port 2 to Port 3. FBG 1504 reflects narrowband light around the pump wavelength.

Experimental Proof-of-Principle Demonstration

Figure 16:
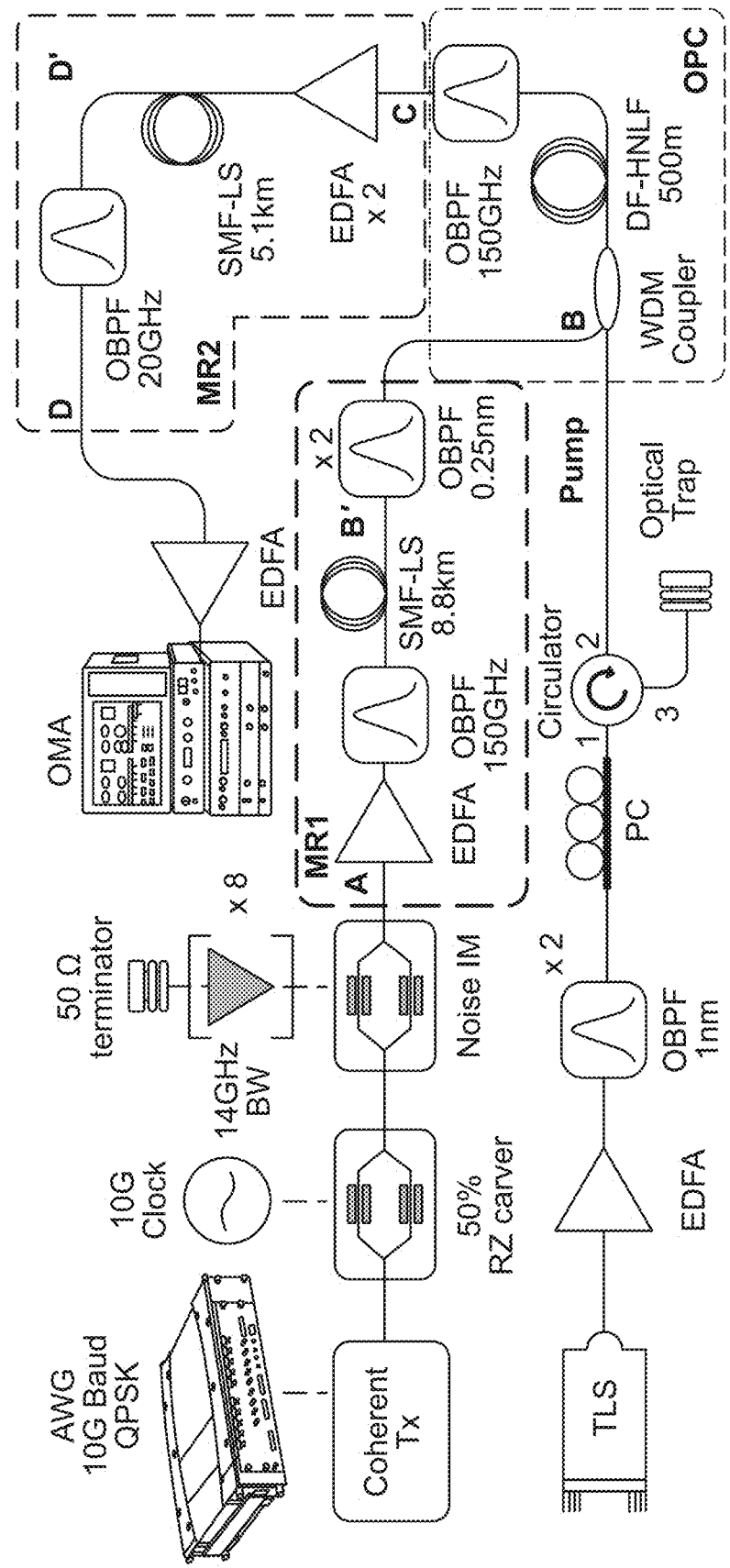
FIG. 16 is a diagram of an example experimental setup, according to some implementations.

Referring now to FIG. 16, an experimental setup for demonstrating use of a Mamyshev regenerator as a phase-preserving amplitude regenerator (PPAR) is shown. While described briefly herein, additional details of this experimental setup are described in C. Guo and M. Vasilyev, "Phase-preserving amplitude regeneration in a Mamyshev regenerator with mid-stage optical phase conjugation," 2023 Optical Fiber Communications Conference and Exhibition (OFC), San Diego, CA, USA, 2023, pp. 1-3, doi: 10.1364/OFC.2023.W2A.31, which is incorporated herein by reference in its entirety.

First, a 10-Gbaud NRZ-QPSK-modulated signal is generated by an IQ coherent transmitter. The IQ coherent transmitter is driven by an arbitrary waveform generator with a root-raised-cosine (RRC) filter having a roll-off factor of 0.7 at wavelength of 1562.23 nm. The modulated signal is carved into 50% RZ pulses by an intensity modulator driven by the symbol-rate clock. After, the signal is loaded with amplitude noise by another intensity modulator driven by amplified Nyquist-Johnson thermal noise with 14 GHz bandwidth. This noise is generated by eight cascaded. RF amplifiers. Constellation map measurements were taken using an optical modulation analyzer (OMA) with signal pre-amplified to 16 dBm by an erbium-doped fiber amplifier (EDFA) before the OMA.

Figure 17A:
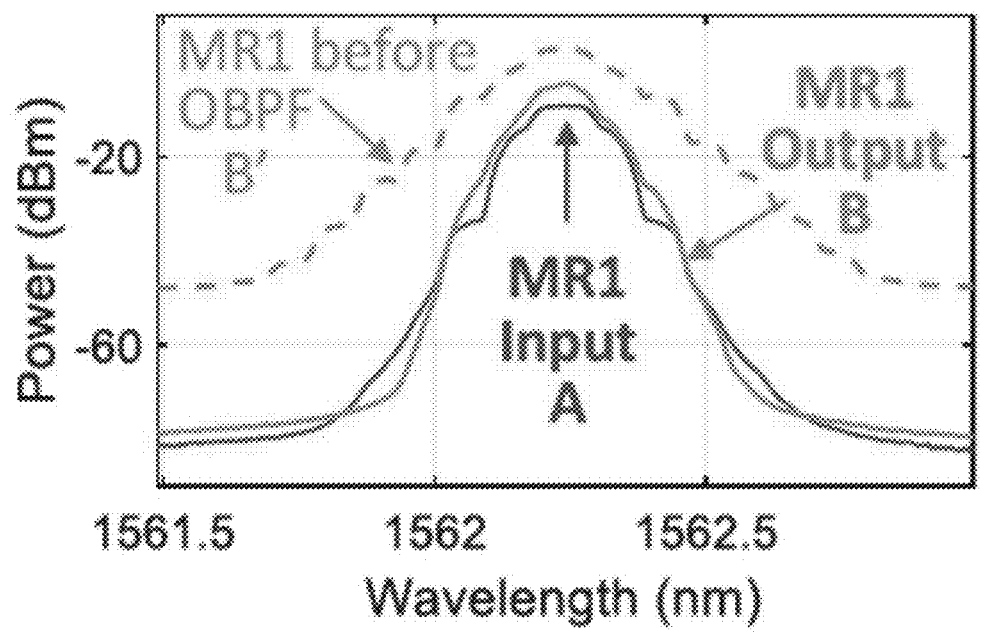
FIGS. 17A and 17B are diagrams of a signal spectra at various locations in the example experimental setup of FIG. 16, according to some implementations.
Figure 18:
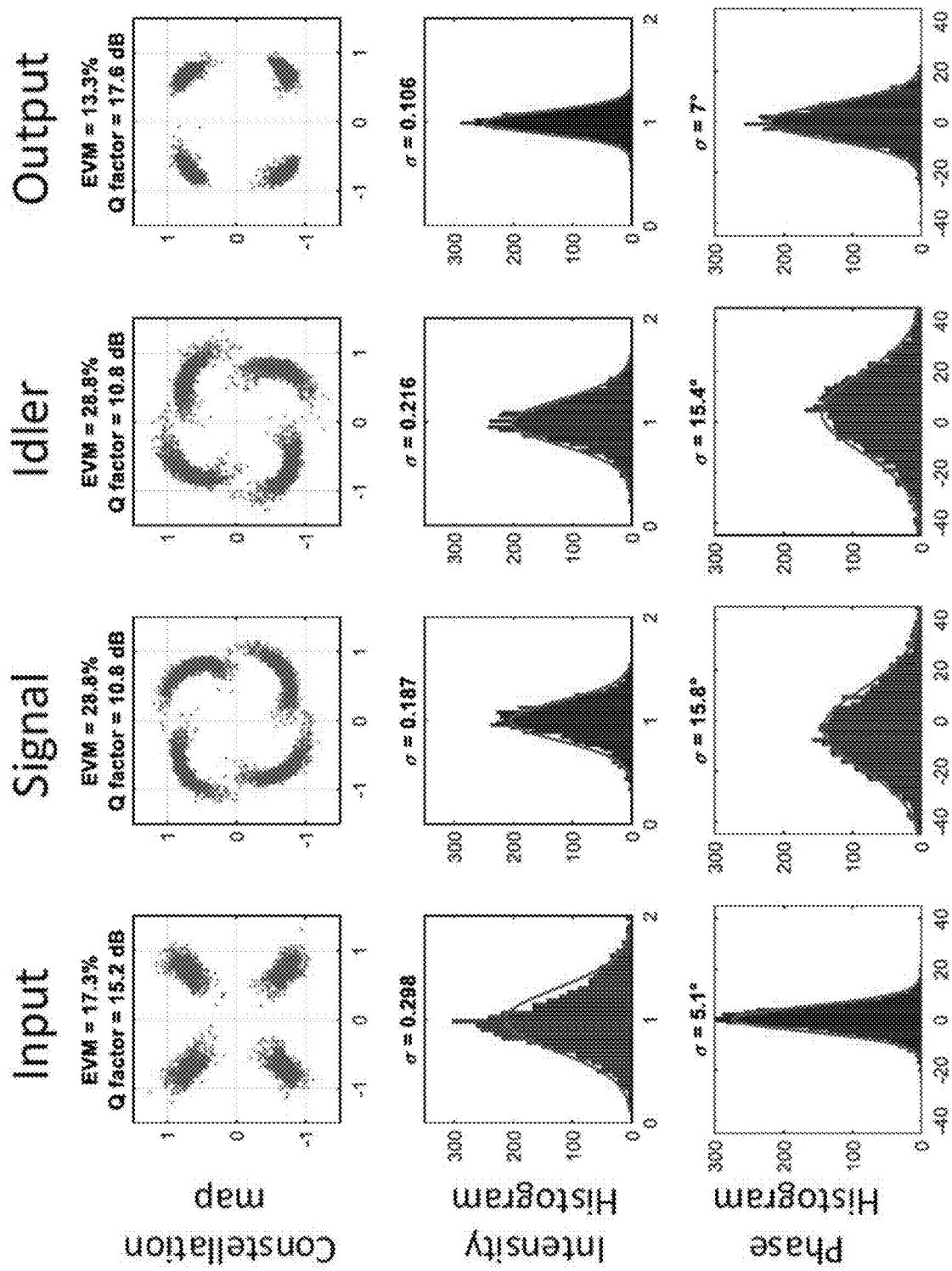
FIG. 18 includes constellation maps, intensity histograms, and phase histograms corresponding to various locations in the example experimental setup of FIG. 16, according to some implementations.

As shown, the generated noisy 50% RZ-QPSK signal is sent to first Mamyshev regenerator (MR1) for partial regeneration of the amplitude. In MR1, the signal is amplified by an EDFA, passed through 150-GHz-wide OBPF to remove out-of-band amplified spontaneous emission (ASE) noise, and sent into 8.8-km-long SMF-LS™ fiber at an average power level of 16.7 dBm to accumulate a peak nonlinear phase shift of 1.15 rad. SMF-LS™ is a non-zero dispersion-shifted fiber with slightly normal dispersion (−0.5 . . . −3.0 psi/nm/km) in the C-band. Then, the signal is filtered by two cascaded 0.25-nm-wide OBPFs to achieve a moderate amount of amplitude regeneration. Since QPSK format does not have any symbols with zero amplitude level, the OBPFs do not need to be off-centered. The spectra of the input noisy signal at the location A and the SPM-broadened (or partially regenerated) signal at the location B' (or B) are shown in FIG. 17A. The constellation maps, as well as intensity and phase histograms corresponding to locations A and B, are shown in the first two columns of FIG. 18. The standard deviation of the intensity distribution shrinks from σ≈0.30 before MR1 to σ≈0.19 after MR1, demonstrating (at least partial) amplitude regeneration by MR1. However, the signal's phase undergoes significant distortion due to nonlinear amplitude-to-phase noise transfer, as is clearly visible in both the constellation map and phase histogram after MR1.

After MR1, the signal is sent to the fiber-parametric-amplifier-based OPC. The OPC pump at wavelength of 1552.54 nm is generated by a tunable laser source (TLS) and is amplified by an EDFA. The amplified pump is filtered by two OBPFs (0.8 nm and 1 nm bandwidths) to remove the out-of-band. ASE noise. The clean pump is sent into the OPC through Port 1 of a circulator that is used to redirect back-propagating stimulated Brillouin scattering (SBS) light into an optical trap at Port 3. From Port 2 of the circulator, the pump is sent to a polarization controller (PC) used to align the polarization states of the pump and the signal and is combined by a WDM coupler with the signal. Then, the signal and pump enter a 500-m-long dispersion-flattened highly nonlinear fiber (DF-HNLF) with γ=21.4/W/km and zero-dispersion wavelength of 1551.5 nm. The input power of the signal is kept at −1 dBm to avoid nonlinear phase shift accumulation in DF-HNLF. The output idler is generated at 1542.94 nm with −17-dBm power, which represents conversion efficiency (CE) of −16 dB. The low CE is due to the SBS threshold that limits the continuous-wave (CW) pump power to 16.2 dBm.

Figure 17B:
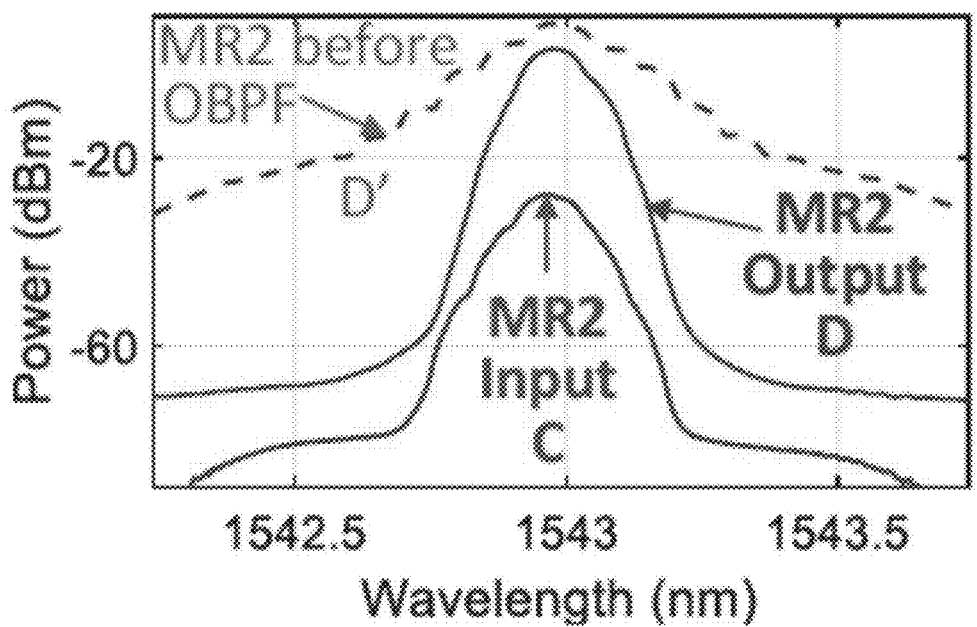

The idler is filtered by a 150-GHz-wide OBPF and sent to the second Mamyshev regenerator MR2. The spectrum of filtered idler at location C is shown in FIG. 17B. The corresponding constellation map, as well as intensity and phase histograms, are shown in the third column of FIG. 18. The idler beam's intensity distribution has standard deviation σ≈0.22, representing small increase compared to the signal entering the OPC, owing to poor idler noise figure at low CE and, possibly, some relative-intensity noise transfer from pump to idler. The constellation maps indicate that the nonlinear phase distortion map of the signal is flipped vertically after the OPC, as expected, while the amount of phase distortion remains approximately the same (standard deviation of phase≈15.4°).

In MR2, the filtered idler is amplified by two cascaded EDFAs to 19.8 dBm and sent through a 5.1-km-long SMF-LS™ to accumulate a peak nonlinear phase shift of 1.46 rad. Then, the idler is filtered by a 20-GHz-wide OBPF to realize the amplitude regeneration. The SPM-broadened idler at location D' and regenerated idler at location D are shown in FIG. 17B. The constellation map, as well as intensity and phase histograms corresponding to D are shown in the fourth column of FIG. 18. The regenerated idler beam has standard deviation of the intensity distribution σ=0.106, representing 2.8-times reduction compared to the intensity noise at the input of MR1. The constellation map and phase histogram of the output idler beam indicate that the nonlinear phase distortion introduced by MR1 is mostly compensated (its standard deviation is reduced from ≈15.8° to ≈7°, which is just a small increase over input 5.1° deviation), and the EVM and Q-factor improvements over the MR1 input are 4.0% and 2.4 dB, respectively. The amplitude noise suppression by this 3-stage regenerator can significantly reduce the nonlinear amplitude-to-phase noise transfer in any subsequent nonlinear propagation through transmission fibers, leading to potential reach increase.

In summary, the experimental setup shown in FIG. 16 demonstrates the phase-preserving amplitude regeneration of a 10-Gbaud 50%-duty-cycle RZ-QPSK signal by a three-stage optical regenerator combining two Mamyshev regenerators and an optical phase conjugator placed between them (e.g., as in processor 700). The regeneration improves Q-factor by 2.4 dB, EVM by 4.0%, and reduces the standard deviation of the intensity by 2.8 times.

Configuration of Certain Implementations

The construction and arrangement of the systems and methods as shown in the various exemplary implementations are illustrative only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the exemplary implementations without departing from the scope of the present disclosure.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another implementation includes from the one particular value and/or to the other particular value. Similarly, when values are expressed as approximations, by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal implementation, "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific implementation or combination of implementations of the disclosed methods.

What is claimed is:

1. An all-optical signal processor comprising:
one or more input ports configured to receive one or more optical signal channels;
a first nonlinear optical processor configured to receive an input signal from the one or more input ports, the first nonlinear optical processor comprising one or more sections of a first nonlinear medium, wherein the input signal to the first nonlinear optical processor has a nonlinear relationship with an output signal of the first nonlinear optical processor;
an optical phase conjugator optically configured to receive the output signal of the first nonlinear optical processor, wherein the optical phase conjugator is configured to perform at least one of: i) complex conjugation of an electric field of the output signal of the first nonlinear optical processor, or ii) inversion of an optical spectrum of the output signal of the first nonlinear optical processor;
a second nonlinear optical processor configured to receive an output signal from the optical phase conjugator, the second nonlinear optical processor comprising one or more sections of a second nonlinear medium, wherein the output signal from the optical phase conjugator received by the second nonlinear optical processor has a nonlinear relationship with an output signal of the second nonlinear optical processor; and
one or more output ports configured to receive the output signal from the second nonlinear optical processor.

2. The all-optical signal processor of claim 1, wherein at least one of the one or more input ports is configured to receive multiple wavelength-division-multiplexed (WDM) channels.

3. The all-optical signal processor of claim 1, wherein the all-optical signal processor performs 2R regeneration of the one or more optical signal channels, wherein 2R regeneration comprises re-amplification and nonlinear optical reshaping of a probability density function of input signals received from the one or more optical signal channels.

4. The all-optical signal processor of claim 1, wherein at least one of the first nonlinear medium or the second nonlinear medium is configured to at least one of: (i) retain intra-channel nonlinear-optical effects, or (ii) suppress nonlinear interactions among a plurality of wavelength-division-multiplexed (WDM) channels, wherein the plurality of WDM channels are received by at least one port of the one or more input ports.

5. The all-optical signal processor of claim 1, wherein phase noise arising from nonlinear amplitude-to-phase noise transfer in the first nonlinear optical processor is substantially compensated by the second nonlinear optical processor.

6. The all-optical signal processor of claim 1, wherein the one or more optical signal channels include at least a first optical signal and a second optical signal, wherein a power level of the first optical signal is greater than a power level of the second optical signal.

7. The all-optical signal processor of claim 6, wherein at least one of the first nonlinear optical processor or the second nonlinear optical processor is configured to invert the power levels of the first and second optical signals.

8. The all-optical signal processor of claim 1, wherein at least one of the first nonlinear medium or the second nonlinear medium is configured to at least one of: (i) spectrally broaden the one or more optical signal channels, or (ii) suppress interactions among the one or more optical signal channels.

9. The all-optical signal processor of claim 1, wherein at least one of the first nonlinear optical processor or the second nonlinear optical processor comprises an optical bandpass filter or a periodic optical bandpass filter.

10. The all-optical signal processor of claim 1, wherein at least one of the first nonlinear optical processor or the second nonlinear optical processor comprises at least one of: a Mamyshev 2R regenerator, a nonlinear optical loop mirror (NOLM), or an imbalanced NOLM.

11. The all-optical signal processor of claim 1, wherein at least one of the first nonlinear medium and the second nonlinear medium comprises at least one section of highly nonlinear material and at least one periodic group-delay device (PGDD).

12. The all-optical signal processor of claim 1, wherein in each section of the first nonlinear medium and each section of the second nonlinear medium, a group delay is accumulated between center frequencies of adjacent wavelength-division-multiplexed (WDM) channels, wherein an absolute value of the group delay accumulated between the center frequencies of the adjacent WDM channels is substantially larger than an absolute value of the group delay accumulated between any two frequency components of either one of the adjacent channels.

13. An all-optical signal processor comprising:
one or more input ports configured to receive one or more optical signal channels;
a nonlinear optical processor configured to receive an input signal from the one or more input ports, the nonlinear optical processor comprising one or more sections of a nonlinear medium, wherein the input signal to the nonlinear optical processor has a nonlinear relationship with an output signal of the nonlinear optical processor;

an optical phase conjugator optically configured to receive the output signal of the nonlinear optical processor, wherein the optical phase conjugator is configured to generate a conjugated signal from the output signal of the nonlinear optical processor by performing at least one of: i) complex conjugation of an electric field of the output signal of the nonlinear optical processor, or ii) inversion of an optical spectrum of the output signal of the nonlinear optical processor, wherein the conjugated signal is passed back through the nonlinear optical processor and therefore co-propagates or counter-propagates with the input signal to the nonlinear optical processor; and one or more output ports configured to receive the conjugated signal after passing hack through the nonlinear optical processor.

14. The all-optical signal processor of claim 13, wherein the input signal to the nonlinear optical processor and the conjugated signal are combined or separated by one of:

a wavelength band splitter/combiner;

a wavelength-division multiplexing (WDM) coupler;

an optical interleaver/de-interleaver;

an optical circulator; or a programmable optical filter.

15. The all-optical signal processor of claim 13, further comprising an optical amplifier, wherein the conjugated signal output by the optical phase conjugator is amplified by the optical amplifier before being passed back through the nonlinear optical processor.

16. The all-optical signal processor of claim 15, wherein the optical amplifier is further configured to amplify the input signal to the nonlinear optical processor.

17. The all-optical signal processor of claim 15, wherein the optical amplifier further amplifies one or more pump beams.

18. The all-optical signal processor of claim 13, further comprising a pump add/drop multiplexer, wherein one or more pump beams are added or dropped using the pump add/drop multiplexer.

19. The all-optical signal processor of claim 18, wherein the pump add/drop multiplexer comprises an optical circulator or a fiber Bragg grating (FBG).

20. The all-optical signal processor of claim 13, further comprising one or more optical bandpass filters (OBPFs) or periodic OBPFs to filter at least one of the input signal or the conjugated signal.

* * * * *